US010579922B2

(12) United States Patent
Huo et al.

(10) Patent No.: US 10,579,922 B2
(45) Date of Patent: Mar. 3, 2020

(54) DEEP LEARNING USING ALTERNATING DIRECTION METHOD OF MULTIPLIERS

(71) Applicant: Microsoft Technology Licensing, LLC, Redmond, WA (US)

(72) Inventors: Qiang Huo, Beijing (CN); Zhi-Jie Yan, Beijing (CN); Kai Chen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 619 days.

(21) Appl. No.: 15/129,813

(22) PCT Filed: Apr. 8, 2014

(86) PCT No.: PCT/CN2014/074885
§ 371 (c)(1),
(2) Date: Sep. 27, 2016

(87) PCT Pub. No.: WO2015/154216
PCT Pub. Date: Oct. 15, 2015

(65) Prior Publication Data
US 2017/0147920 A1    May 25, 2017

(51) Int. Cl.
*G06N 3/08* (2006.01)
*G06F 16/28* (2019.01)
(Continued)

(52) U.S. Cl.
CPC ............... *G06N 3/08* (2013.01); *G06F 7/523* (2013.01); *G06F 16/285* (2019.01); *G06N 3/0454* (2013.01); *G06N 3/084* (2013.01)

(58) Field of Classification Search
CPC ........ G06N 3/08; G06N 3/084; G06N 3/0454; G06F 16/285; G06F 7/523
(Continued)

(56) References Cited

U.S. PATENT DOCUMENTS 7,552,098 B1    6/2009   Haffner
7,562,060 B2    7/2009   Sindhwani et al.
(Continued)

FOREIGN PATENT DOCUMENTS

CN    101719222 A    6/2010
CN    102882530 A    1/2013
(Continued)

OTHER PUBLICATIONS

Boyd, Distributed Optimization, 2010.*
(Continued)

*Primary Examiner* — William A Jerez Lora
(74) *Attorney, Agent, or Firm* — Schwegman Lundberg & Woessner, P.A.

(57) ABSTRACT

The use of the alternating direction method of multipliers (ADMM) algorithm to train a classifier may reduce the amount of classifier training time with little degradation in classifier accuracy. The training involves partitioning the training data for training the classifier into multiple data blocks. The partitions may preserve the joint distribution of input features and an output class of the training data. The training may further include performing an ADMM iteration on the multiple data blocks in an initial order using multiple worker nodes. Subsequently, the training of the classifier is determined to be completed if a stop criterion is satisfied following the ADMM iteration. Otherwise, if the stop criterion is determined to be unsatisfied following the ADMM iteration, one or more additional ADMM iterations may be performed on different orders of the multiple data blocks until the stop criterion is satisfied.

18 Claims, 4 Drawing Sheets

(51) Int. Cl.
*G06N 3/04* (2006.01)
*G06F 7/523* (2006.01)

(58) Field of Classification Search
USPC .................................. 706/6, 10, 15, 20, 25
See application file for complete search history.

(56) References Cited

U.S. PATENT DOCUMENTS

| | | | |
|---|---|---|---|
| 7,711,663 | B2 | 5/2010 | Weng |
| 8,306,931 | B1 | 11/2012 | Bowman et al. |
| 8,719,194 | B2 | 5/2014 | Qin et al. |
| 2003/0055796 | A1 | 3/2003 | Shetty et al. |
| 2007/0009160 | A1* | 1/2007 | Loo .................. G06K 9/0051 382/225 |
| 2007/0094214 | A1 | 4/2007 | Li et al. |
| 2008/0300833 | A1 | 12/2008 | Zhang |
| 2011/0320767 | A1 | 12/2011 | Eren et al. |
| 2012/0023043 | A1* | 1/2012 | Cetin .................. G06N 7/005 706/12 |
| 2012/0254086 | A1 | 10/2012 | Deng et al. |
| 2013/0054566 | A1 | 2/2013 | Xu et al. |
| 2013/0138436 | A1 | 5/2013 | Yu et al. |
| 2013/0138589 | A1 | 5/2013 | Yu et al. |
| 2013/0152057 | A1 | 6/2013 | Ke et al. |
| 2013/0212052 | A1 | 8/2013 | Yu et al. |
| 2013/0282634 | A1 | 10/2013 | Deng et al. |
| 2013/0290223 | A1 | 10/2013 | Chapelle et al. |
| 2013/0343641 | A1 | 12/2013 | Mnih et al. |
| 2014/0067738 | A1* | 3/2014 | Kingsbury ............. G06N 3/08 706/20 |
| 2014/0072209 | A1 | 3/2014 | Brumby et al. |

FOREIGN PATENT DOCUMENTS

| | | |
|---|---|---|
| CN | 102938144 A | 2/2013 |
| CN | 103150596 | 6/2013 |
| CN | 103680496 | 3/2014 |

OTHER PUBLICATIONS

"Office Action Issued in European Patent Application No. 14889068.4", dated Jun. 23, 2017, 8 Pages.

"Supplementary Search Report Issued in European Patent Application No. 14889068.4", dated Jun. 1, 2017, 5 Pages.

Castelli, et al., "Semi-unsupervised Weighted Maximum-Likelihood Estimation of Joint Densities for the Co-training of Adaptive Activation Functions", In IAPR International Workshop on Partially Supervised Learning, Sep. 15, 2011, pp. 62-71.

Hirayama, et al., "Sparse and Low-Rank Estimation of Time-Varying Markov Networks with Alternating Direction Method of Multipliers", In the Processing Neural Information Processing, Theory and Algorithms, Nov. 22, 2010, 10 Pages.

Chinese Office Action dated Apr. 21, 2017 for Chinese Patent Application No. 201480037824.4, a counterpart foreign application of U.S. Appl. No. 15/129,813, 14 pgs.

Wen, et al., "Survey of Applying Support Vector Machines to Handle Large-scale Problems", Computer Science, vol. 36, No. 7, Jul. 2009, pp. 20-31.

Dean, et al., "Large Scale Distributed Deep Networks", Neural Information Processing Systems (NIPS2012), Dec. 2012, 11 pages.

Niu, et al., "Hogwild!: A Lock-Free Approach to Parallelizing Stochastic Gradient Descent", Computer Sciences Department, University of Wisconsin-Madison, Jun. 2011, 22 pages.

PCT Search Report and Written Opinion dated Dec. 31, 2014 for PCT Application No. PCT/CN2014/074885, 13 Pages.

Povey, et al., "The Kaldi Speech Recognition Toolkit", IEEE Signal Processing Society, Feb. 2012, 4 pages.

\* cited by examiner

DEEP LEARNING USING ALTERNATING DIRECTION METHOD OF MULTIPLIERS

CROSS-REFERENCE TO RELATED APPLICATIONS

This application is a National Stage Patent Application of International Application No. PCT/CN2014/074885, filed Apr. 8, 2014, which is incorporated herein by reference.

BACKGROUND

Deep neural networks (DNNs) may be used to perform tasks such as speech recognition, image recognition, handwriting analysis, and object classification. DNNs may be trained to perform a particular task using techniques such as mini-batch based stochastic gradient descent (SGD), asynchronous SGD, model averaging, or a combination of asynchronous SGD and model averaging. However, each of these techniques has drawbacks. For example, mini-batched SGD is a sequential training procedure. Accordingly, training of DNNs using mini-batch SGD is difficult to parallelize across multiple computing devices. Further, although techniques such as asynchronous SGD or model averaging may enable the parallelization of training across multiple computing nodes, DNNs that are trained using such techniques generally produce results that are inferior to those produced using mini-batched SGD.

SUMMARY

Described herein are techniques for training deep neural networks (DNNs) using an alternating direction method of multipliers (ADMM) algorithm. The DNNs may be trained to perform tasks such as speech recognition, image recognition, handwriting analysis, and object classification. The use of the ADMM algorithm may enable the training of the DNNs to be parallelized across multiple computing nodes. In other words, the training of the DNNs may be distributed across the multiple computing nodes to speed up the training process. Each of the computing nodes may be a central processing unit (CPU) or a graphics processing unit (GPU) that resides in a computing device.

The application of the ADMM algorithm to train the DNNs may include a training data partition phase and a distributed ADMM iteration phase. In the training data partition phase, the training data may be partitioned into multiple non-overlapping data blocks that preserve a joint distribution of the input features and the output class of the data blocks. In the distributed ADMM iteration phases, the non-overlapping data blocks may be iteratively processed by the multiple computing nodes to train the DNNs until a predetermined stop criterion is satisfied. The trained DNNs may be used by a data analysis engine to classify input data. The input data may be speech, images, objects, and other data. In turn, the data analysis engine may respectively provide text that corresponds to the speech, classification of the images, recognition of objects based on their visual characteristics, etc.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Described herein are techniques for training deep neural networks (DNNs) using an alternating direction method of multipliers (ADMM) algorithm. The DNNs may be trained to perform tasks such as speech recognition, image recognition, handwriting analysis, and object classification. The use of the ADMM algorithm may enable the training of the DNNs to be parallelized across multiple computing nodes. In other words, the training of the DNNs may be distributed across the multiple computing nodes to speed up the training process. Each of the computing nodes may be a central processing unit (CPU) or a graphics processing unit (GPU) that resides in a computing device.

The application of the ADMM algorithm to train the DNNs may include a training data partition phase and a distributed ADMM iteration phase. In the training data partition phase, the training data may be partitioned into multiple non-overlapping data blocks that preserve a joint distribution of the input features and the output class of the data blocks. In the distributed ADMM iteration phases, the non-overlapping data blocks may be iteratively processed by the multiple computing nodes to train the DNNs until a predetermined stop criterion is satisfied. The trained DNNs may be used by a data analysis engine to classify input data. The input data may be speech, images, objects, and other data. In turn, the data analysis engine may respectively provide text that corresponds to the speech, classification of the images, recognition of objects based on their visual characteristics, etc.

In at least one embodiment, the training involves partitioning the training data for training the classifier into multiple data blocks. The partitions may preserve the joint distribution of input features and an output class of the training data. The training may further include performing an ADMM iteration on the multiple data blocks in an initial order using multiple worker nodes. Subsequently, the training of the classifier is determined to be completed if a stop criterion is satisfied following the ADMM iteration. Otherwise, if the stop criterion is determined to be unsatisfied following the ADMM iteration, an additional ADMM iteration may be performed on a different order of the multiple data blocks.

The use of the ADMM training algorithm may reduce the amount of time used to train the DNNs for a particular purpose. The decreased training time may lead to an increase in the implementation and usage of the DNNs in performing tasks. Additionally, the results provided by the DNNs that are trained using the ADMM algorithm are comparable in terms of accuracy to the results that are produced by DNNs that are trained by conventional and slower techniques such as mini-batch based stochastic gradient descent (SGD). Further, because the application of the ADMM algorithm to train the DNNs using multiple nodes is scalable, the techniques may be scaled out to train DNNs using ever larger quantities of training data. Accordingly, the techniques are readily adaptable to train DNNs for more data-intensive classification tasks in the future.

Various examples of techniques for training of the DNNs for data analysis in accordance with various embodiments are described below with reference to FIGS. 1-4.

Example Scheme

Figure 1:
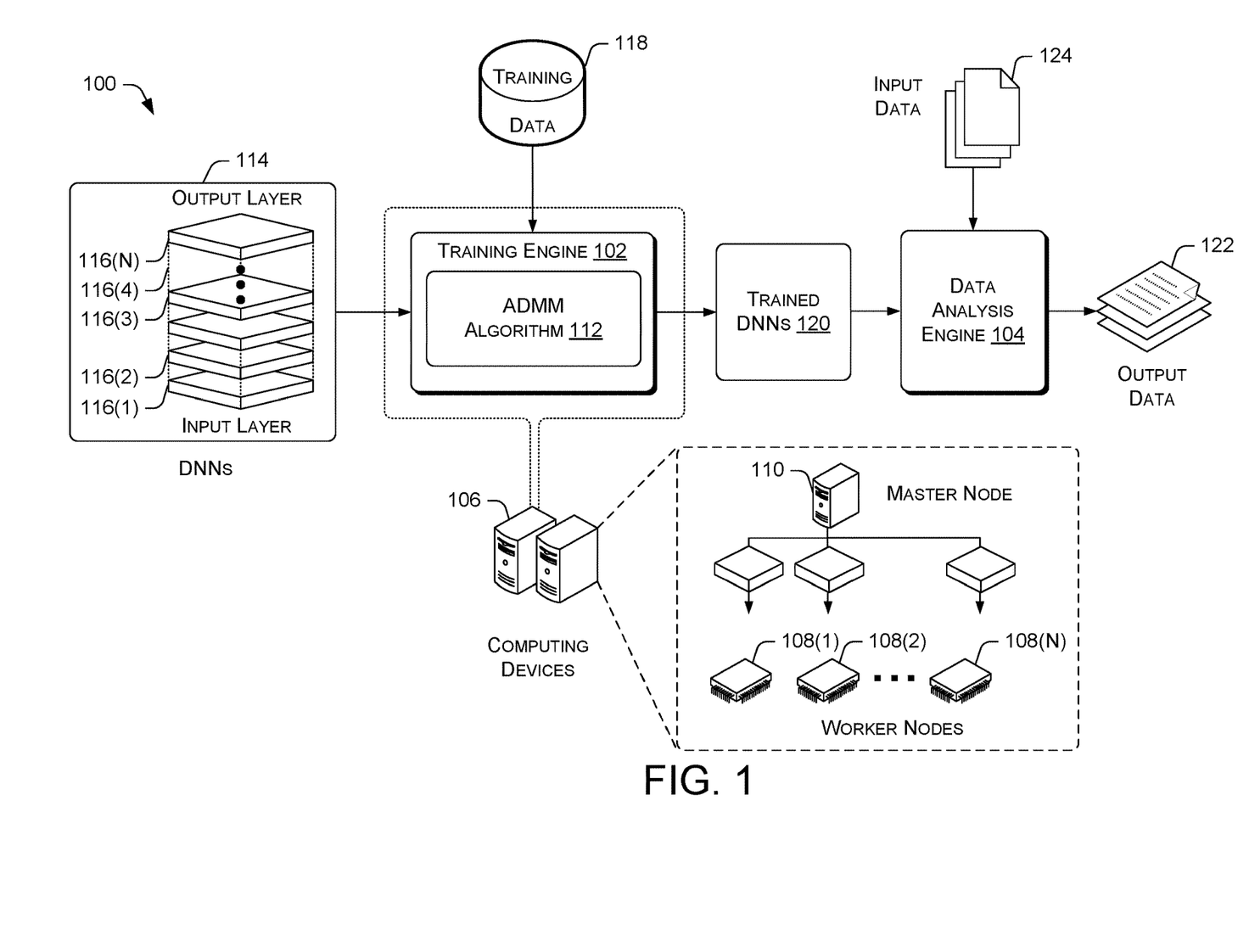
FIG. 1 is a block diagram that illustrates an example scheme for implementing a training engine that uses an alternating direction method of multipliers (ADMM) algorithm to train a classifier.

FIG. 1 is a block diagram that illustrates an example scheme 100 for implementing a training engine that uses an alternating direction method of multipliers (ADMM) algorithm to train a classifier. The example scheme 100 may include a training engine 102 and a data analysis engine 104. The training engine 102 may be executed on multiple computing devices 106. The multiple computing devices 106 may include general purpose computers, such as desktop computers, tablet computers, laptop computers, servers, and so forth. However, in other embodiments, the computing devices 106 may include smart phones, game consoles, or any other electronic devices. The multiple computing devices 106 may include various processors, such as central processor units (CPUs), graphics processor units (GPUs), other types of processors, or a combination of any of the above. These processors may constitute worker nodes 108(1)-108(N) that process data. Further, one of the computing devices 106 may act as a master node 110 that distributes data to the worker nodes 108(1)-108(N) for processing. Accordingly, the training engine 102 may include the worker nodes 108(1)-108(N) and the master node 110.

The training engine 102 may use an ADMM algorithm 112 to train a classifier in the form of deep neural networks (DNNs) 114 for performing data analysis, such as for use in speech recognition. In various embodiments, the DNNs 114 may include an input layer 116(1) and an output layer 116(N), as well as multiple hidden layers, such as the multiple layers 116(2)-116(4), in which N denotes any integer. In some embodiments, the DNNs 114 may include a total of nine layers. Accordingly, in such embodiments, the value of N is "9" as there are nine layers. Training data 118 may be used by the ADMM algorithm 112 to train the DNNs 114. In the context of speech recognition, the training data 118 may be a speech corpus that includes a collection of sample speech from human speakers. For example, the speech corpus may include North American English speech samples collected from speakers of North American English in the United States and Canada. However, in other implementations, the training data 118 may include images, handwriting samples, or other data. In speech recognition, the input layer 116(1) may receive feature vectors in the form of Mel-frequency cepstral coefficients (MFCC) features, perceptual linear prediction (PLP) features, log-filter-bank-output features, or so forth. The output layer 116(N) may provide output classes in the form of tied-HMM states. However, the output layer 116(N) may also provide other units as classes, such as phones, context-dependent phones, or so forth. In another example, the training engine 102 may use an ADMM algorithm 112 to train the DNNs 114 to perform image classification. In image classification, the input layer 116(1) may receive input data in the form of raw images, and the output layer 116(N) may provide classes in the form of image categories.

The computations performed by the ADMM algorithm 112 may be parallelized across the worker nodes 108(1)-108(N). For example, the master node 110 may partition the training data 118 into multiple non-overlapping data blocks that preserve a joint distribution of the input features and the output class. Subsequently, the master node 110 may distribute the data blocks in random order to the worker nodes 108(1)-108(N) for processing using the ADMM algorithm in a first iteration. Such an ADMM iteration trains the DNNs 114. Once all the data blocks are processed in the iteration, the master node 110 may randomize the order of the processed data blocks. The newly ordered data blocks are subsequently distributed to the worker nodes 108(1)-108(N) for an additional iteration of processing by the ADMM algorithm. The master node 110 may repeat such randomization and distributed processing of the data blocks until a predetermined stop criterion is satisfied. The satisfaction of the stop criterion may indicate that the training of the DNNs 114 is complete. For example, the stop criterion may be that the accuracy of the results produced by the DNNs 114 with respect to a set of validation data has satisfied a predetermined threshold.

Thus, by using the ADMM algorithm 112 and the training data 118, the training engine 102 may produce trained DNNs 120 from the DNNs 114. In turn, the data analysis engine 104 may use the trained DNNs 120 to produce output data 122 from the input data 124. In some implementations, the data analysis engine 104 may be a speech-to-text engine that uses the trained DNNs 120 to produce output data 122 in the form of output text from the input data 124 that is in the form of input speech. The data analysis engine 104 may be executed on the computing devices 106 or on one or more computing devices that are similar to the computing devices 106. The data analysis engine 104 may receive live input data 124 from a microphone and audio processing components of the computing device. Alternatively, the data analysis engine 104 may receive input data 124 from a media file or stream, for example for the purpose of audio-indexing of the spoken content in the media file/stream. In other embodiments, the data analysis engine 104 may be a text-to-speech engine that uses the trained DNNs 120 to synthesize output speech based on input text.

In alternative embodiments, the DNNs 114 may be trained using other training data 118 for other data analysis purposes. For example, the training data may include labeled images from an image database. In such an example, the training of the DNNs 114 using the training data via the ADMM algorithm 112 may produce trained DNNs 120 that are used by the data analysis engine 104 to classify input images into different categories. In instances in which the images in the training data 118 include typed text, the data analysis engine 104 may use the trained DNNs 120 to perform optical character recognition (OCR) on an input image that includes text. In another example, the training data may include labeled handwriting samples from various persons, and the training via the ADMM algorithm 112 may produce trained DNNs 120 that are used by the data analysis engine 104 to recognize and match particular input handwritten text to a particular person. In such an example, the data analysis engine 104 may receive the input handwritten text as a scanned or stored image file, and provide an output message that indicates whether the handwritten text matches the handwriting of the particular individual.

Example Components

Figure 2:
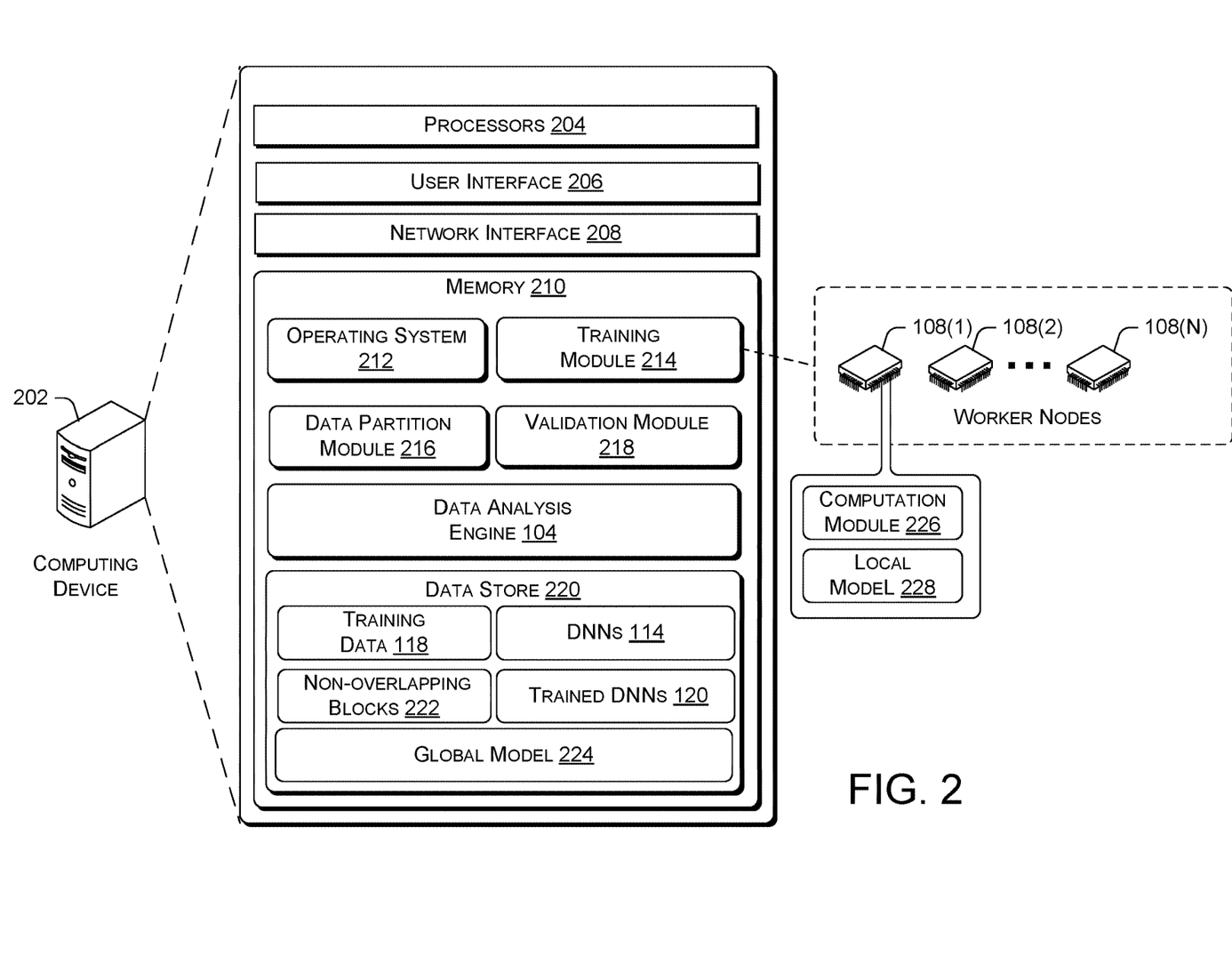
FIG. 2 is an illustrative diagram that shows example components of a master node that applies the ADMM algorithm to training a classifier by distributing data for processing by worker nodes.

FIG. 2 is an illustrative diagram that shows example components of a master node that applies the ADMM algorithm to training a classifier by distributing data for processing by the worker nodes. The master node may be implemented by the computing device 202. The computing device 202 may include one or more processors 204, a user interface 206, a network interface 208, and memory 210. In various embodiments, the computing device 202 may be one of the computing devices 106.

Each of the processors 204 may be a single-core processor or a multi-core processor. The user interface 206 may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices or other electronic/software selection methods.

The network interface 208 may include wired and/or wireless communication interface components that enable the computing device 202 to transmit and receive data via a network. In various embodiments, the wireless interface component may include, but is not limited to cellular, Wi-Fi, Ultra-wideband (UWB), Bluetooth, satellite transmissions, and/or so forth. The wired interface component may include a direct I/O interface, such as an Ethernet interface, a serial interface, a Universal Serial Bus (USB) interface, and/or so forth. As such, the computing device 202 may have network capabilities. For example, the computing device 202 may exchange data with other electronic devices (e.g., laptops computers, servers, etc.) via one or more networks, such as the Internet. Such electronic devices may provide the worker nodes 108(1)-108(N).

The memory 210 may be implemented using computer-readable media, such as computer storage media. Computer-readable media includes, at least, two types of computer-readable media, namely computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that may be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The memory 210 of the computing device 202 may store modules that implement the training engine 102. The modules may include an operating system 212, a training module 214, a data partition module 216, and a validation module 218. The training module 214, the data partition module 216, and the validation module 218 are a part of the training engine 102. Each of the modules may include routines, programs instructions, objects, and/or data structures that perform particular tasks or implement particular abstract data types. Additionally, a data store 220 and the data analysis engine 104 may reside in the memory 210.

The operating system 212 may include components that enable the computing device 202 to receive data via various inputs (e.g., user controls, network interfaces, and/or memory devices), and process the data using the processors 204 to generate output. The operating system 212 may further include one or more components that present the output (e.g., display an image on an electronic display, store data in memory, transmit data to another electronic device, etc.). The operating system 212 may enable a user to interact with modules of the training engine 102 using the user interface 206. Additionally, the operating system 212 may include other components that perform various other functions generally associated with an operating system.

The training module 214 may use the ADMM algorithm 112 to train the classifier in the form of DNNs 114 based on the training data 118. The ADMM algorithm 112 is an iterative algorithm that solves a general equality-constrained convex optimization problem for the convex objective function:

$$\min_{x,z} f(x) + g(z) \tag{1}$$

subject to the linear constraint $Ax+Bx=c$, in which $x \in R^n$, $z \in R^m$, $A \in R^{p \times n}$, $B \in R^{p \times m}$, $c \in R^p$, and $f(.)$ and $g(.)$ are convex.

Further, the execution of the ADMM algorithm 112 on the multiple worker nodes 108(1)-108(N) may be based on an original distributed optimization problem:

$$\min_X E(x, D) \tag{2}$$

in which the training data set D may be split into N subsets $\{D_i | i=1, \ldots, N\}$, and the original distributed optimization problem may be formulated into the following global consensus problem:

$$\min_{\{x_i | i = 1, \ldots, N\}} \sum_{i=1}^{N} E(x_i, D_i) \tag{3}$$

for which the global consensus problem is subject to $x_i - z = 0$, $i=1, \ldots, N$, and in which $x_i$'s are local variables and $z$ is a common global variable.

Thus, to solve the global consensus problem, the ADMM algorithm 112 may be executed on multiple computing nodes using the iterations:

$$x_i^{k+1} = \arg\min_{x_i} \{E(x_i, D_i) + (y_i^k)^T (x_i - z^k) + \frac{\rho}{2} \|x_i - z^k\|_2^2\} \tag{4}$$

with the simplified z-update:

$$z^{k+1} = \frac{1}{N} \sum_{i=1}^{N} x_i^{k+1} \tag{5}$$

and $y_i^0$ is set such that $\Sigma_{i=1}^N y_i^0 = 0$. In Eq. (4), $\rho$ is a penalty parameter which can be set empirically in practice, and $y_i^k$'s are dual variables, which are updated as follows:

$$y_i^{k+1} = y_i^k + \rho(x_i^{k+1} - z^{k+1}) \tag{6}$$

Accordingly, the training module 214 may execute the ADMM algorithm 112 iteratively to train the DNNs 114, in which an iteration of the execution may be conceptualized as the following steps: (1) broadcast z to N computing nodes (e.g., the worker nodes 108(1)-108(N)); (2) update $x_i$ independently on each computing node; (3) aggregate $x_i$ to update z; and (4) broadcast the updated z to the N computing nodes, and update $y_i$ independently on each computing node. In various embodiments, the training module 214 may perform such iteration until a stop criterion is reached.

In actual implementation, the training of the DNNs 114 based on the training data 118 may include a training data partition phase and a distributed ADMM iteration phase. The partition of the training data 118 into data blocks may enable the training module 214 to iteratively distribute the data blocks to the worker nodes 108(1)-108(N) for processing. The training module 214 may use the data partition module 216 to perform the training data partition phase.

The data partition module 216 may partition the training data 118 into multiple non-overlapping data blocks 222, such that each data block preserves joint distribution of the input features and the output class, i.e., p(input features, output class). In various embodiments, the data partition module 216 may partition the training data 118 into data subsets based on class labels of the feature vectors in the training data 118. The partitioning may be performed such that data with feature vectors that have a common class label may be clustered together in a common data subset to generate multiple data subsets. Subsequently, for each data subset, the data partition module 216 may perform a k-means clustering of the feature vectors in the subset to form one or more data clusters. The data partition module 216 may further randomly partition the feature vectors of the data clusters into multiple non-overlapping data blocks 222. In this way, the training data 118 may be partitioned to preserve joint distribution of the input features and the output class.

In at least one embodiment, the data partition module 216 may set the size of the multiple non-overlapping data blocks 222 according to one or more factors. These factors may include the volume of the training data to be processed, the number of worker nodes processing the training data 118, the data processing capabilities of the worker nodes (e.g., processor speed and/or data transfer bandwidth of each worker node), the number of non-overlapping data blocks 222 that are desired, and so forth. For example, training data with a larger size may result in larger size data blocks, while increasing the number of worker nodes may result in decreased data block size. Additionally, increasing the processing capabilities of the worker nodes may cause the data partition module 216 to produce larger data blocks. Conversely, decreasing the processing capabilities of the worker nodes may cause the data partition module 216 to produce smaller data blocks.

Once the data partition module 216 has produced the multiple non-overlapping data blocks 222 from the training data 118, the training module 214 may execute ADMM iterations on the multiple non-overlapping data blocks 222. In an initial iteration, the training module 214 may randomize an order of the multiple non-overlapping data blocks 222 that are produced by the data partition module 216. The training module 214 may process an initial data block of the multiple non-overlapping data blocks 222 by splitting the initial data block into multiple subsets and distribute the multiple subsets to the worker nodes 108(1)-108(N), such that each of the worker nodes 108(1)-108(N) may process a corresponding subset. The training module 214 may also broadcast a global model of the DNNs 114, as represented by the variable z in equation (4), to each of the worker nodes 108(1)-108(N). Each of the worker nodes 108(1)-108(N) may process a corresponding subset to independently update a stored local model, as represented by the variable x in equation (4), using a single-sweep mini-batch based SGD. In alternative embodiments, each worker node may implement multiple sweeps of the mini-batch based SGD, as opposed to the single-sweep of the mini-batch based SGD. However, because the DNN training objective function is actually non-convex rather than convex, the implementation of a single sweep of the mini-batch based SGD may offer performance that is equal to or superior to the implementation of multiple sweeps of the mini-batch based SGD. Subsequently, the training module 214 may aggregate the local models from the worker nodes 108(1)-108(N) to update the global model that is stored on the master node 110.

The training module 214 may repeat the data block splitting and the distributed processing of the resultant subsets on the worker nodes 108(1)-108(N) sequentially for the remaining data blocks of the multiple non-overlapping data blocks 222. Each of the remaining data blocks may be processed using an updated global model that results from the processing of the previous data block of the multiple non-overlapping data blocks 222. Accordingly, the training module 214 may complete the initial ADMM iteration when all the data blocks of the multiple non-overlapping data blocks 222 are processed.

Once the training module 214 has completed the initial ADMM iteration, the training module 214 may use the validation module 218 to determine whether a stop criterion has been satisfied. Accordingly, if the stop criterion is not satisfied, the training module 214 may initiate another iteration of the ADMM iteration by randomizing an order of the multiple non-overlapping data blocks 222, and repeat the sequential distribution of the multiple non-overlapping data blocks 222 in the newly randomized order to the worker nodes for another iteration of processing. The training module 214 may repeat the iterations until the stop criterion is satisfied. On the other hand, if the stop criterion is satisfied, the training module 214 may determine that the DNNs 114 have been converted into the trained DNNs 120.

In various embodiments, the stop criterion may be any sensible criterion that is designed to indicate that DNNs 114 are ready for use by the data analysis engine 104. For example, the stop criterion may be a relative change in the non-convex objective function after an ADMM iteration. Accordingly, the validation module 218 may determine that the stop criterion is satisfied when the relative change is less than a predetermined change threshold. In another example, the validation module 218 may compare the classification accuracy of the DNNs 114 with respect to a validation data set with baseline classification accuracy. The baseline classification accuracy may be the classification accuracy of DNNs with respect to the validation data set that are trained using a proven method (e.g., mini-batch based SGD). Accordingly, the validation module 218 may determine that the stop criterion is satisfied when the classification accuracy of the DNNs 114 after an ADMM iteration is within a predetermined percentage of the baseline classification accuracy. In other embodiments, the validation module 218 may use other parameters as stop criteria. For example, the validation module 218 may monitor a model parameter of the global model of the DNNs 114, and determine that a stop criterion is satisfied when the parameter reaches a predetermined value.

Further, the number of worker nodes 108(1)-108(N) processing the training data 118 and the quantity of data subsets that are distributed to the worker nodes 108(1)-108(N) may be scaled based on a size of the training data 118. For example, the training module 214 may employ a larger number of worker nodes and a corresponding larger quantity of data subsets for a larger size training data, and vice versa. In this way, the implementation of the ADMM-based training of the DNNs 114 may be scaled up or scaled down depending on the size of the training data 118.

The data store 220 may store data that are used by the various modules. In at least one embodiment, the data store may store the training data 118, the DNNs 114, the non-overlapping data blocks 222, the trained DNNs 120, as well as a global model 224. Each set of data may be stored in a data table, a data array, and/or other data storage structures.

The worker nodes 108(1)-108(N) may reside on the one or more computing devices 106. The worker nodes 108(1)-108(N) are components of the training engine 102. In some embodiments, the worker nodes 108(1)-108(N) may use interfaces to exchange data with the master node 110 and/or each other. The interfaces may include local interfaces within a computing device (e.g., peripheral component interconnect bus interfaces) or network interfaces (e.g., network interface controllers) between computing devices. For example, in instances in which two of the worker nodes 108(1)-108(N) reside on different computing device, the worker nodes may exchange data with each using a network via a network interfaces. The network may be a local area network (LAN), a wide area network (WAN), or a combination of both, such as the Internet. The worker nodes 108(1)-108(N) may also exchange data with the master node 110 via the local interfaces and/or remote interfaces.

Each of the worker nodes 108(1)-108(N) may have access to memory that is functionally similar to the memory 210. The memory may be provided by one or more of the computing devices 106. The memory accessible to the worker nodes 108(1)-108(N) may store modules that are executable by the worker nodes to perform the mini-batched based SGD on the training data subsets and update the local models. For example, the worker node 108(1) may execute a computation module 226 that updates a local model 228. The worker nodes 108(1)-108(N) may also use corresponding interfaces to receive the global model 224 from the master node 110 and transmit the updated local models to the master node 110.

The data analysis engine 104 may reside on the computing devices 106. However, in alternative embodiments, the data analysis engine 104 may reside on one or more alternative computing devices. In such embodiments, the trained DNNs 120 may be exported to the one or more alternative computing device for use by the data analysis engine 104.

Example Processes

Figure 3:
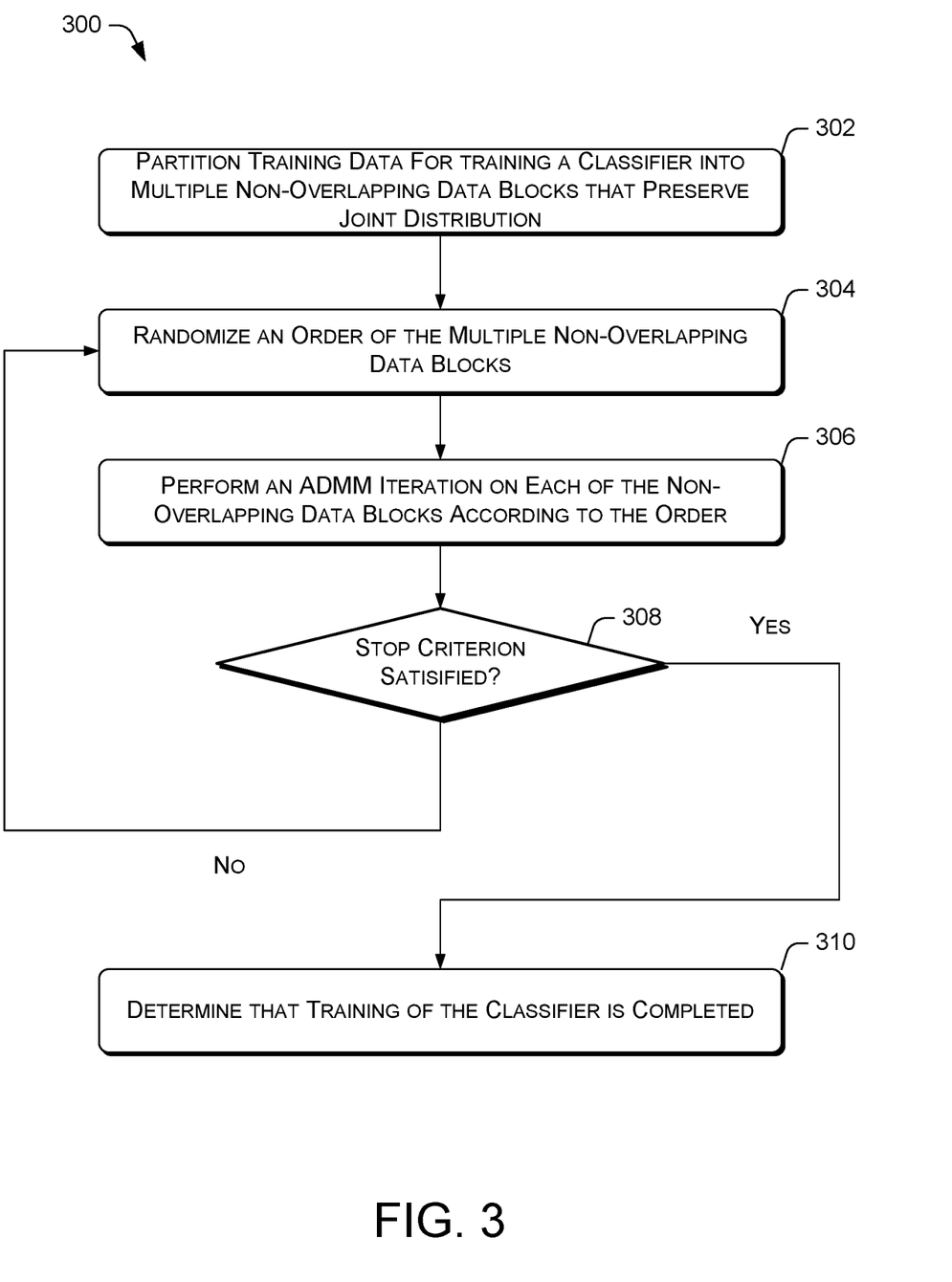
FIG. 3 is a flow diagram that illustrates an example process for using the ADMM algorithm to train a classifier based on training data.
Figure 4:
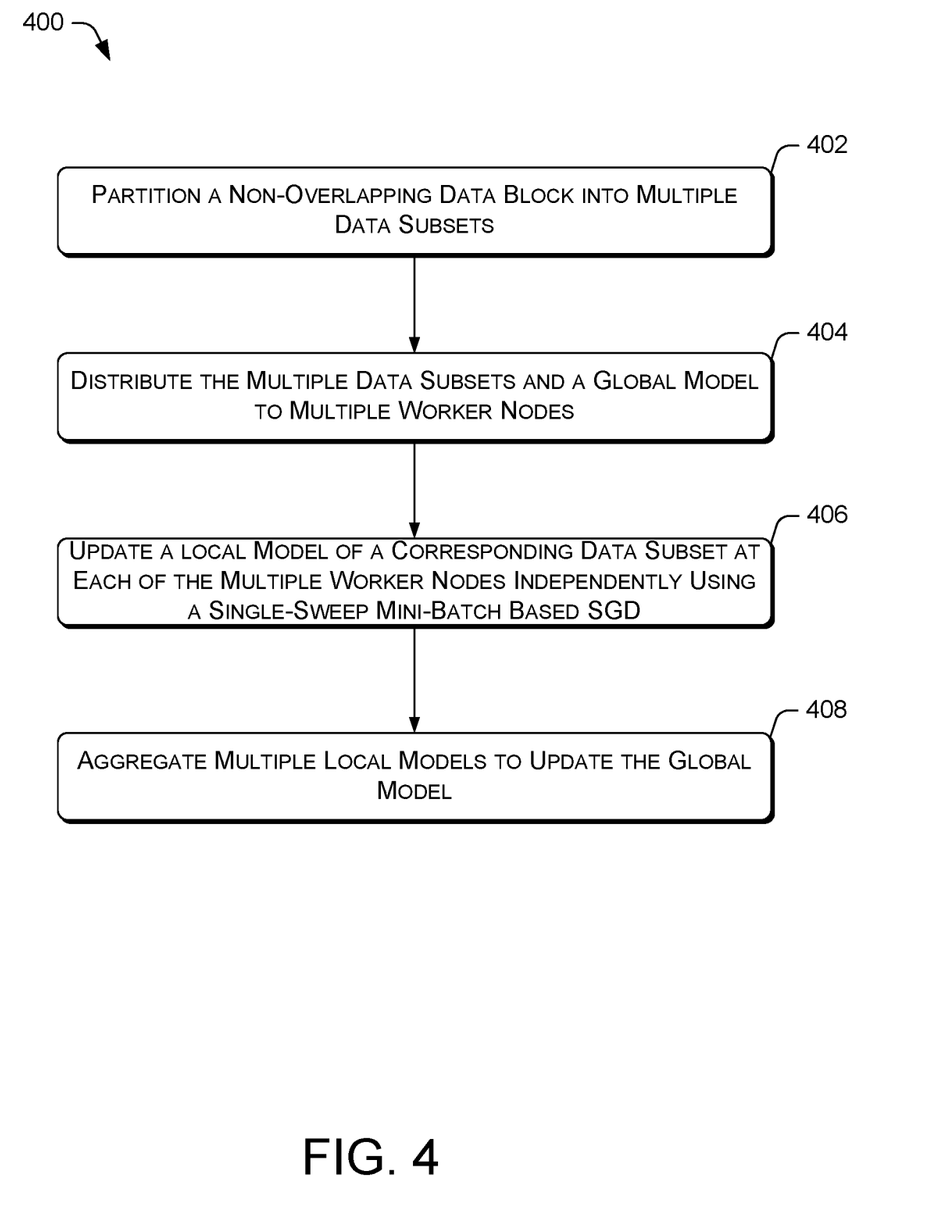
FIG. 4 is a flow diagram that illustrates an example process for executing an ADMM iteration on the multiple worker nodes to train a classifier.

FIGS. 3 and 4 describe various example processes for training deep neural networks (DNNs) using an alternating direction method of multipliers (ADMM) algorithm to perform data analysis, such as for the purpose of speech recognition. The order in which the operations are described in each example process is not intended to be construed as a limitation, and any number of the described operations may be combined in any order and/or in parallel to implement each process. Moreover, the operations in each of the FIGS. 3 and 4 may be implemented in hardware, software, and a combination thereof. In the context of software, the operations represent computer-executable instructions that, when executed by one or more processors, cause one or more processors to perform the recited operations. Generally, computer-executable instructions include routines, programs, objects, components, data structures, and so forth that cause the particular functions to be performed or particular abstract data types to be implemented.

FIG. 3 is a flow diagram that illustrates an example process 300 for using the ADMM algorithm to train a classifier based on training data. At block 302, the training engine 102 may partition the training data 118 for training a classifier into multiple non-overlapping data blocks. Each of the multiple non-overlapping data blocks may be partitioned in a way that preserves the joint distribution of the input features and an output class of the training data. The classifier may include DNNs 114. In various embodiments, the partitioning of the training data 118 may be performed offline, i.e., not concurrently with the execution of the ADMM iterations to train the DNNs 114.

At block 304, the training engine 102 may randomize an order of the multiple non-overlapping data blocks. The randomization of the order may ensure that the training engine 102 processes the data blocks in different orders over multiple ADMM iterations. At block 306, the training engine 102 may perform an ADMM iteration on each of the multiple non-overlapping data blocks according to the order to train the DNNs 114. The performance of the ADMM iteration may include the distribution of each non-overlapping data block as subsets of data to multiple worker nodes 108(1)-108(N) for processing. In various embodiments, each of the worker node 108(1)-108(N) may use a single-sweep mini-batch SGD to process its corresponding subset of data.

At decision block 308, the training engine 102 may determine whether a stop criterion has been satisfied. If the training engine 102 determines that the stop criterion is satisfied ("yes" at decision block 308), the process 300 may proceed to block 310. At block 310, the training engine 102 may determine that the training of the classifier is complete. In various embodiments, the stop criterion may be any sensible criterion that is designed to indicate that DNNs 114 are ready for use by the data analysis engine 104. For example, the stop criterion may be a relative change in the non-convex objective function after an ADMM iteration. In another example, the training engine 102 may determine that the stop criterion is satisfied when the classification accuracy of the DNNs 114 after an ADMM iteration is within a predetermined percentage of a baseline classification accuracy.

However, if the training engine 102 determines that the stop criterion is unsatisfied ("no" at decision block 308), the process 300 may loop back to block 304, so that another randomization of the order of the multiple non-overlapping data blocks and another ADMM iteration may be performed.

FIG. 4 is a flow diagram that illustrates an example process 400 for executing an ADMM iteration on the multiple worker nodes to train the classifier. The process 400 may further describe block 306 of the process 300. At block 402, the training engine 102 may partition a non-overlapping data block into multiple data subsets. At block 404, the training engine 102 may use the master node 110 to distribute the multiple data subsets with the global model 224 to multiple worker nodes 108(1)-108(N). Accordingly, each of the worker nodes 108(1)-108(N) may process a corresponding data subset based on the global model 224. At block 406, each of the worker nodes 108(1)-108(N) of the training engine 102 may process a corresponding data subset to independently update a stored local model (e.g., local model 228) using a single-sweep mini-batch based SGD. In alternative embodiments, each worker node may implement multiple sweeps of the mini-batch based SGD, as opposed to the single-sweep of the mini-batch based SGD. At block 408, the training engine 102 may use the master node 110 to aggregate the local models from the worker nodes 108(1)-108(N) to update the global model 224 associated with the DNNs 114.

The training techniques described herein may reduce the amount of time used to train the DNNs for a particular purpose. The decreased training time may lead to an increase in the implementation and usage of the DNNs in performing tasks. Additionally, the results provided by the DNNs that are trained using the ADMM algorithm are comparable in terms accuracy to the results that are produced by DNNs trained by conventional and slower techniques such as mini-batch based stochastic gradient descent (SGD). Further, because the application of the ADMM algorithm to train the DNNs using multiple nodes is scalable, the techniques may be scaled out to train DNNs using ever larger quantities of training data. Accordingly, the techniques are readily adaptable to train DNNs for more data-intensive classification tasks in the future.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

What is claimed is:

1. One or more non-transitory computer-readable storage media storing computer-executable instructions that are executable to cause one or more processors to perform acts comprising:
   partitioning training data for training a classifier into multiple data blocks that preserve joint distribution of input features and an output class of the training data;
   distributing the multiple data blocks to a plurality of worker nodes such that the plurality of worker nodes perform an alternating direction method of multipliers (ADMM) iteration on the multiple data blocks in an initial order to train the classifier, wherein the initial order causes the multiple data blocks to be processed in a first sequence by the plurality of worker nodes;
   providing the multiple data blocks to the plurality of worker nodes such that the plurality of worker nodes perform an additional ADMM iteration on the multiple data blocks in a different order to train the classifier in response to a stop criterion being unsatisfied following the ADMM iteration, wherein the different order causes the multiple data blocks to be processed in a second sequence by the plurality of worker nodes, the second sequence being different from the first sequence; and
   determining that the classifier is trained into a trained classifier in response to the stop criterion being satisfied following the ADMM iteration.

2. The one or more computer-readable media of claim 1, further comprising classifying input data via the trained classifier to generate output data.

3. The one or more computer-readable media of claim 2, wherein the classifying the input data includes performing one of speech recognition, image recognition, handwriting analysis, or object classification.

4. The one or more computer-readable media of claim 1, wherein the classifier includes deep neural networks.

5. The one or more computer-readable media of claim 1, wherein the plurality of worker nodes includes a plurality of central processors and a plurality of graphics processors.

6. The one or more computer-readable media of claim 1, wherein the multiple data blocks are non-overlapping data blocks.

7. The one or more computer-readable media of claim 1, wherein a size of each data block of the multiple data blocks is based on at least one of a volume of the training data processed, a number of worker nodes processing the training data, data processing capabilities of the multiple worker nodes, and a desired number of the multiple data blocks.

8. The one or more computer-readable media of claim 1, wherein the determining includes ascertaining that the stop criterion is satisfied in response to a relative change in an objective function associated with the ADMM iteration being less than a predetermined change threshold, a classification accuracy of the trained classifier with respect to a validation data set being within a predetermined percentage of a baseline classification accuracy generated by a baseline classifier for the validation data set, or a model parameter of a global model associated with the classifier reaching a predetermined value.

9. The one or more computer-readable media of claim 1, wherein the partitioning the training data includes:
   partitioning the training data into data subsets based on class labels of feature vectors in the training data, each data subset having data with corresponding feature vectors that share a common class label;
   performing a k-means clustering of the feature vectors in the data subsets to form a plurality of data clusters; and
   partitioning the feature vectors of the data clusters randomly into the multiple data blocks.

10. The computer-readable medium of claim 1, wherein a performance of the ADMM iteration or a performance of the additional ADMM iteration includes:
    partitioning a data block of the multiple data blocks into multiple data subsets;
    distributing the multiple data subsets and a global model to the multiple worker nodes, each of the worker nodes having a local model;
    receiving updated local models corresponding to the multiple data subset from the multiple worker nodes, each updated local model being updated independently at a corresponding worker node using a single-sweep mini-batch based stochastic gradient descent processing of a corresponding data subset; and
    aggregating the updated local models to update the global model.

11. The computer-readable medium of claim 10, wherein a quantity of the multiple data subsets and a quantity of the worker nodes are scalable based on a size of the training data.

12. A computer-implemented method, comprising:
    partitioning training data for training deep neural networks (DNNs) into multiple non-overlapping data blocks that preserve joint distribution of input features and an output class of the training data;
    performing an alternating direction method of multipliers (ADMM) iteration on the multiple non-overlapping data blocks in an initial order using multiple worker nodes to train the DNNs, wherein the initial order causes the multiple data blocks to be processed in a first sequence by the plurality of worker nodes;
    performing an additional ADMM iteration on the multiple non-overlapping data blocks in a different order in response to the stop criterion being unsatisfied following the ADMM iteration, wherein the different order causes the multiple non-overlapping data blocks to be processed in a second sequence by the multiple worker nodes, the second sequence being different from the first sequence;

determining that the DNNs are trained into trained DNNs in response to a stop criterion being satisfied following the ADMM iteration; and classifying input data via the trained DNNs to generate output data.

13. The computer-implemented method of claim 12, wherein the classifying the input data includes performing one of speech recognition, image recognition, handwriting analysis, or object classification.

14. The computer-implemented method of claim 12, wherein the determining includes ascertaining that the stop criterion is satisfied in response to a relative change in an objective function associated with the ADMM iteration being less than a predetermined change threshold, a classification accuracy of the trained DNNs with respect to a validation data set being within a predetermined percentage of a baseline classification accuracy generated by a baseline classifier for the validation data set, or a model parameter of a global model associated with the classifier reaching a predetermined value.

15. The computer-implemented method of claim 12, wherein the performing the ADMM iteration includes:
    partitioning a data block of the multiple non-overlapping data blocks into multiple data subsets;
    distributing the multiple data subsets and a global model to the multiple worker nodes;
    updating a local model of a corresponding data subset at each of the multiple worker nodes independently using a single-sweep mini-batch based stochastic gradient descent processing of the corresponding data subset; and
    aggregating multiple local models to update the global model.

16. A system, comprising:
    a plurality of processors;
    a memory that includes instructions that, when executed by the plurality of processors, cause the plurality of processors to perform operations to:
        partition training data for training deep neural networks (DNNs) into multiple data blocks that preserve joint distribution of input features and an output class of the training data; and
        perform an alternating direction method of multipliers (ADMM) iteration on the multiple data blocks in an initial order using multiple worker nodes to train the DNNs, wherein the initial order causes the multiple data blocks to be processed in a first sequence by the plurality of worker nodes, the multiple worker nodes including a plurality of central processors or a plurality of graphics processors, and determines that the DNNs are trained into trained DNNs in response to a stop criterion being satisfied following the ADMM iteration, wherein an additional ADMM iteration in performed on the multiple data blocks in a different order in response to the stop criterion being unsatisfied following the ADMM iteration, and wherein the different order causes the multiple data blocks to be processed in a second sequence by the multiple worker nodes, the second sequence being different from the first sequence.

17. The system of claim 16, the memory further comprising instructions to determine that the stop criterion is satisfied in response to a relative change in an objective function associated with the ADMM iteration being less than a predetermined change threshold, a classification accuracy of the trained DNNs with respect to a validation data set being within a predetermined percentage of a baseline classification accuracy generated by a baseline classifier for the validation data set, or a model parameter of a global model associated with the classifier reaching a predetermined value.

18. The system of claim 16, wherein the instructions to perform the ADMM iteration include instruction that cuase the plurality of processors to:
    partition a data block of the multiple data blocks into multiple data subsets;
    distribute the multiple data subsets and a global model to the multiple worker nodes, each of the worker nodes having a local model;
    receive updated local models corresponding to the multiple data subsets from the multiple worker nodes, each updated local model being updated independently at a corresponding worker node using a single-sweep mini-batch based stochastic gradient descent processing of a corresponding data subset; and
    aggregate the updated local models to update the global model.

* * * * *